(12) United States Patent
Bedi et al.

(10) Patent No.: US 9,900,503 B1
(45) Date of Patent: Feb. 20, 2018

(54) METHODS TO AUTOMATICALLY FIX FLASH REFLECTION AT CAPTURE TIME

(71) Applicant: Adobe Systems Incorporated, San Jose, CA (US)

(72) Inventors: Ajay Bedi, Hamirpur (IN); Subham Gupta, Roorkee (IN); Poonam Bhalla, New Delhi (IN); Krishna Singh Karki, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/404,982

(22) Filed: Jan. 12, 2017

(51) Int. Cl.
*H04N 9/64* (2006.01)
*H04N 5/232* (2006.01)
*H04N 5/235* (2006.01)

(52) U.S. Cl.
CPC ......... *H04N 5/23229* (2013.01); *H04N 5/235* (2013.01); *H04N 9/646* (2013.01)

(58) Field of Classification Search
CPC ................................................ H04N 5/23229
USPC ........................................................ 348/242
See application file for complete search history.

(56) References Cited

U.S. PATENT DOCUMENTS

2005/0190288 A1* 9/2005 Yamada ............... H04N 5/2354
348/371

* cited by examiner

*Primary Examiner* — Usman Khan
(74) *Attorney, Agent, or Firm* — Kilpatrick Townsend & Stockton LLP

(57) ABSTRACT

A reflection removal system is capable of automatically removing from digital images reflections related to photographic illumination sources ("flash"), at the time of capture, without user intervention. In an embodiment, the reflection removal system receives a set of digital images taken at substantially the same time from a camera, where one of the image is affected by flash. The images are divided into blocks, and a threshold is determined for each block, indicating the brightest pixel value related to the content of the block. The reflection removal system compares each pixel in the flash-affected image to the corresponding threshold, and generates a digital mask based on the comparison. The reflection removal system creates a corrected image based on the digital mask, such that pixels affected by flash are modified based on corresponding pixels in the other images. In an embodiment, the corrected image is color blended.

20 Claims, 13 Drawing Sheets

US 9,900,503 B1

METHODS TO AUTOMATICALLY FIX FLASH REFLECTION AT CAPTURE TIME

FIELD OF THE INVENTION

This disclosure relates generally to the field of digital image processing, and more specifically relates to processing techniques to remove flash glare from digital images at time of capture.

BACKGROUND

The ready availability of camera technology, particularly in small, lightweight computing devices, has increased the prevalence of amateur photography. Owners of smartphones and tablet devices often desire to take informal or candid shots, often with little or no time to prepare camera settings or the environment of the shot. Camera users also often choose to publish the picture in a very short amount of time, such as by "sharing" the picture to an online social media environment. In addition, camera users frequently wish to take pictures in low-light or indoor venues that require additional light from the camera flash. In these situations, reflective surfaces—including mirrors, eyeglasses, windows, or even polished objects—cause the flash to reflect back to the camera during the photo exposure. This results in unattractive glare appearing in the digital photograph. In addition to being unattractive or distracting, flash glare during a photographic exposure obscures the intended content of the photo, preventing the photographer from capturing the desired moment.

Some efforts to eliminate glare from photographs include taking a picture without using a flash. However, this results in images with content that is poorly illuminated, blurry, or otherwise of poor quality. Current efforts at glare removal include post-processing by software, such as flash-removal techniques performed on a digital image after the digital image is captured. However, this process is time-consuming, and prevents the photographer from quickly sharing the picture. Also, post-processing techniques require expertise that an amateur photographer may not have. In addition, because the content information behind the reflection cannot be artificially recreated by software, the results appear incomplete or unsatisfactory.

Thus, existing solutions involve disadvantages such as (but not limited to) inability to remove glare from a photograph at the time of capture while preserving the quality of image content or otherwise capturing image content that is obscured by reflections.

SUMMARY

According to certain embodiments, a reflection removal system receives a digital image taken while a camera flash was activated, and another digital image taken while the camera had a relatively high sensitivity setting. A digital mask is created by comparing pixels in the image with flash to pixels in the image with the high setting. The digital mask indicates pixels that are affected by reflections from the flash. The reflection removal system modifies the image taken with flash based on the digital mask and the image taken with the high sensitivity setting. In some embodiments, an additional image taken while the camera had a relatively low sensitivity setting is used to verify the created digital mask.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
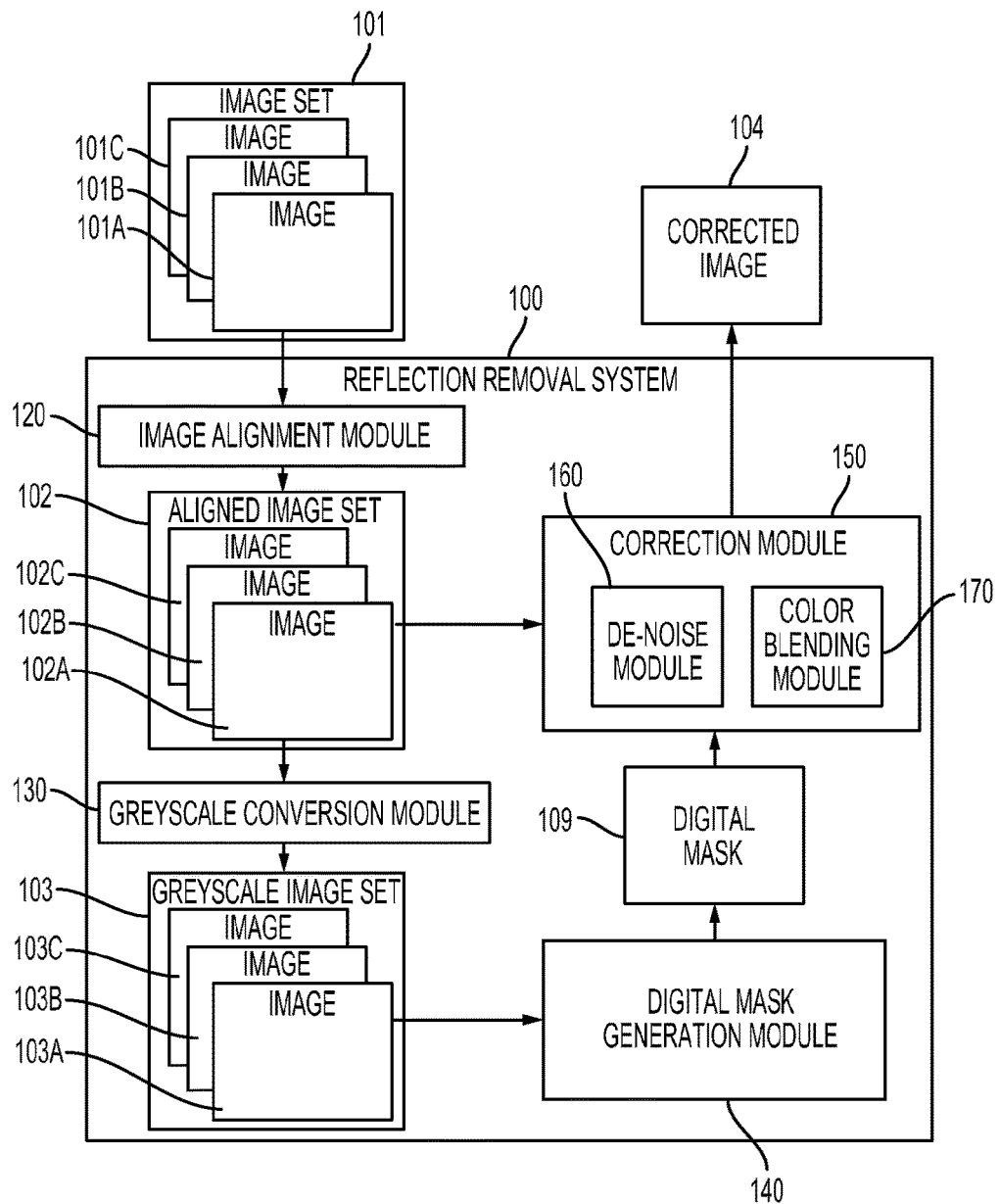
FIG. 1 is a block diagram depicting an example of a reflection removal system, according to certain embodiments.

As discussed above, prior techniques for removing flash reflections from digital photographs do not remove flash glare at the time of capture. Nor do such prior techniques incorporate image content that is obscured by a glare. Certain embodiments described herein determine areas on a digital image that are affected by flash glare, and replace the affected areas with corresponding areas of an additional digital image. In some cases, the described techniques are performed automatically at the time of capture.

The following examples are provided to introduce certain embodiments of the present disclosure. In an embodiment, a reflection removal system removes, from a digital image, reflections caused by an illumination source (e.g., a photographic flash). The reflection removal system receives multiple digital images from a camera, a device including a camera, or some other digital data source. A first image (referred to herein as the "flash image") is taken while an illumination source is activated. A second image (referred to herein as the "high-ISO image") is taken while the illumination source is deactivated, and while the camera has a relatively high sensitivity setting, such as a relatively high ISO setting. In some cases, the multiple images are aligned, such as by using a feature detection technique.

In this example, the flash image and high-ISO image are used to create a digital mask, which indicates pixels in the flash image that are affected by reflections from the illumination source. For instance, the flash and high-ISO image are divided into blocks of pixels, where a block of the flash image is related to a corresponding block of the high-ISO image. Each pixel in the flash image is compared to a local threshold that is based on pixel values in the corresponding block of the high-ISO image. If a pixel in the flash image is determined to have a value exceeding the local threshold value, a corresponding pixel in the digital mask is assigned a value indicating that the pixel in the flash image is affected by reflections from the illumination source.

The reflection removal system modifies the flash image based on the digital mask and the high-ISO image. Content that is present in the high-ISO image (e.g., a well-illuminated "overexposed" image) is incorporated into the flash image, replacing content that is obscured by the flash reflections. Pixels in the flash image are compared to corresponding pixels in the digital mask. If a mask pixel has a value indicating that the mask pixel is affected by reflections, a corresponding pixel in the flash image is modified based on a corresponding pixel in the high-ISO image. For example, if the mask pixel indicates that the mask pixel is affected by reflections, the value of the corresponding pixel in the flash image is modified based on a color value of the corresponding pixel in the high-ISO image.

As used herein, the term "camera" refers to an imaging device that is capable of capturing a photographic or video image. Unless otherwise indicated, a camera includes both specialized devices (e.g., devices with no general functions other than taking pictures) and multipurpose devices (e.g., devices, such as smart phones, that are capable of performing functions besides taking pictures). Examples of cameras include, but are not limited to, still-image cameras, video cameras, smartphones, tablet computing devices, webcams, security cameras, and other devices capable of capturing still images or motion footage.

As used herein, the terms "taking a picture," "capturing," or comparable phrases, refer to the act of capturing one or more digital images using a camera. In some embodiments, taking a picture occurs in response to a single user action. In some cases, multiple images are captured by a same camera at a same time, or substantially the same time, and the captured picture is based on more than one of the multiple images. The multiple images have various illumination levels, settings, or other differences in the camera's actions.

As used herein, the terms "picture" and "photograph" refer to a media item including visual content captured with a camera by a photographer. Unless otherwise indicated, a picture is based on multiple digital images, as described herein.

As used herein, the term "digital image" means an electronic representation of photographic subject matter, such as by set of pixels. A digital image is of any suitable format, such as a bitmap or a JPEG file format. For convenience, digital images are referred to herein as having settings (e.g., a digital image with a high ISO setting). Unless otherwise indicated, this refers to digital images taken by cameras having the setting (e.g., a digital image taken by a camera having a high ISO setting). In some cases, digital images are received from a camera in response to a single user action, such as the action of taking a picture. Additionally or alternatively, digital images are received from a series of related images, such as video data.

As used herein, the terms "photographic content" and "content" refer to the subject matter of a picture or a digital image, unless otherwise indicated. It is to be understood that similar subject matter may have various appearances (or non-appearance) in various digital images. For example, photographic content is obscured (e.g., a person's face being "washed out" or not visible due to bright reflections of a camera flash) in a digital image and visible in another digital image. Additionally or alternatively, colorful clothing has different apparent colors in a digital image with a high sensitivity setting as compared to an image with a low sensitivity setting.

As used herein, the term "flash" means a source of illumination that is activated while a digital image is being captured. Flashes include illumination sources that are included in a camera device, including through-the-lens ("TTL") flash and flash attachments on a camera. Flashes also include separate illumination sources activated by a command to a camera, such as remote or directional flashes.

As used herein, the terms "ISO," "ISO setting," "sensitivity setting," and "light sensitivity setting" refer to a camera's sensitivity to available ambient light in the environment of the subject matter. A higher ISO (or higher sensitivity) indicates that a camera is more sensitive to the ambient light. In some cases, this results in a more desirable picture (e.g., more accurate colors, sharper image for a given shutter speed). Additionally or alternatively, a lower ISO (or lower sensitivity) indicates that the camera is less sensitive to the ambient light. In some cases, this results in a less desirable picture (e.g., less accurate colors, blurry image for a given shutter speed). In some cases, an image with a higher sensitivity setting has more "noise" (e.g., random digital interference unrelated to the content of the picture), relative to an image with a lower sensitivity setting.

As used herein, the term "block" means a group of multiple adjacent pixels within a digital image. A block is any suitable dimension within the image, such as 1×2 pixels or 128×128 pixels. Blocks are depicted herein as rectangular for convenience, but any suitable shape (e.g., square, rectangular, irregular) can be used. Blocks within an image have a similar shape and dimension (e.g., 128×128 pixels), or different shapes and dimensions, or both. Unless otherwise indicated, a block within a digital image should be understood to have the setting of that image.

As used herein, the terms "digital mask" and "mask" refer to a digital image with pixels, such that a value of each pixel in the mask indicates whether that pixel is involved in a transformation. For example, a mask is generated with pixel values indicating either a black color or a white color. The mask is used in a transformation of an additional digital image, where the value of the mask pixels indicates whether a corresponding pixel of the additional image is affected by the transformation. For example, the white color indicates that the corresponding pixel is modified, and the black color indicates that the corresponding pixel is not modified.

Referring now to the drawings, FIG. 1 is a diagram of an exemplary reflection removal system 100 in which one or more embodiments of the present disclosure are practiced. The reflection removal system 100 includes an alignment module 120, a grayscale conversion module 130, a digital mask generation module 140, and a correction module 150. In some embodiments, the correction module 150 includes a de-noising module 160, or a color blending module 170, or both.

In an embodiment, the reflection removal system 100 receives a set of digital images 101, including at least digital image 101a and digital image 101b. In some embodiments, digital image 101c is also included in image set 101. In some cases, the images 101a-101c are received from a camera. The images 101a-101c are captured in response to a single user command, or the images depict similar subject matter, or both. In some embodiments, the digital images in set 101 have different settings. For example, image 101a is an image with flash, such as a digital image taken while an illumination source was activated. Additionally or alternatively, image 101b is an image with a relatively high setting, such as an image taken with a relatively high ISO setting. Additionally or alternatively, image 101c is an image with a relatively low setting, such as an image taken with a relatively low ISO setting.

In some embodiments, the received set of images 101 is provided to an alignment module 120. The alignment module 120 determines whether the content of images 101a-101c is aligned among the images. For example, if images 101a-101c are images taken in a sequence, slight movements of the photographer cause variation in the alignment of the content of each particular image. If the alignment module 120 determines that the content of images 101a-101c is not aligned, the content of the images is aligned. In certain embodiments, alignment of the images 101a-101c is performed using image 101a—the image taken with flash—as a reference image. In some cases, alignment is performed using feature detection. A non-limiting example of a feature detection technique is the Oriented FAST and Rotated BRIEF ("ORB") algorithm, but other feature detection techniques exist. Additionally or alternatively, alignment is performed using homography, such as by aligning features, including detected features, of the digital images.

The alignment module 120 provides a set of aligned images 102. The set of aligned images 102 includes aligned images 102a-102c, where aligned image 102a corresponds to received image 101a, aligned image 102b corresponds to received image 101b, and aligned image 102c corresponds to received image 101c. In some cases, if the alignment module 120 determines that the content of images 101a-101c is aligned among the images, aligned image set 102 is identical to received image set 101.

The set of aligned images 102 is provided to the greyscale conversion module 130. The greyscale conversion module 130 determines whether one or more of images 102a-102c is in color (e.g., pixels in the image have a color value, such as a red-green-blue value). If the greyscale conversion module 130 determines that any of images 102a-102c is in color, the image is converted to greyscale. The set of greyscale images 103 includes aligned images 103a-103c, where greyscale image 103a corresponds to aligned image 102a, greyscale image 103b corresponds to aligned image 102b, and greyscale image 103c corresponds to aligned image 102c. In some cases, if the greyscale conversion module 130 determines that the aligned images 102a-102c are greyscale, greyscale image set 103 is identical to aligned image set 102.

In an embodiment, the set of greyscale images 103 corresponds to the set of received images 101. For example, greyscale image 103a is a greyscale image with flash, based on image 101a taken with flash setting. Additionally or alternatively, greyscale image 103b is a greyscale image with a relatively high setting, based on image 101b taken with a relatively high ISO setting. Additionally or alternatively, greyscale image 103c is a greyscale image with a relatively low setting, based on image 101c taken with a relatively low ISO setting.

The set of greyscale images 103 is provided to a mask generation module 140. The mask generation module 140 produces a digital mask 109 (or "flash mask") based on the set of greyscale images 103. In an embodiment, the greyscale images 103a-103c are divided into blocks of pixels, such as blocks of about 128×128 pixels each. A particular block in image 103a is related to a corresponding block in image 103b and another corresponding block in 103c. In some cases, pixel values within each particular block are normalized (e.g., normalized to a scale of 0 to 1, inclusive).

In an embodiment, the mask generation module 140 compares the pixels of the images 103a-103c on a block basis. For example, within each block of the greyscale image 103b, having a relatively high setting, the pixels are compared to find a local maximum value (e.g., a brightest value within the block). A threshold value for that block is determined based on the local maximum value. Within each block of the greyscale image 103a, with flash, the pixels are compared to the threshold value of the corresponding block in image 103b. If a pixel in image 103a is determined to have a value exceeding the corresponding threshold value, that pixel is determined to be affected by reflections from the illumination source. The mask generation module 140 assigns a value to a corresponding pixel in the digital mask 109, the assigned value indicating that the pixel is affected by reflections (also, a "flash-affected pixel"). Such flash-affected pixels in the digital mask 109 correspond to other pixels in any of the digital images 101a-101c, 102a-102c, and 103a-103c.

In certain embodiments, the mask generation module 140 verifies each threshold determined for a block. For example, the mask generation module 140 compares the pixels within each block of the greyscale image 103b, having a relatively high setting, to determine a local maximum value in each block of 103b. The mask generation module 140 also compares pixels within each block of the greyscale image 103c, having a relatively low setting, to determine a local maximum value in each block of 103c. The respective local maximums in the corresponding blocks of images 103b and 103c are compared. Based on this comparison, the mask generation module 140 verifies that the local maximums for image 103b are accurate. For example, if the image 103b has an unmatched local maximum, which does not correlate to a local maximum in image 103c, the mask generation module 140 determines that the unmatched local maximum is not related to the content of image 103b (e.g., the unmatched maximum is caused by digital noise or an error in the image 103b). In some cases, the mask generation module corrects the local maximum of image 103b to correlate to the local maximum of image 103c, and provide a threshold for the block based on the corrected local maximum. In such cases, the digital mask 109 is generated based on the corrected threshold.

In additional or alternative embodiments, the digital mask 109 and the set of aligned images 102 are provided to the correction module 150. The correction module 150 modifies the aligned image 102a based on the digital mask 109 and aligned image 102b. For example, if a particular pixel in digital mask 109 has a value indicating that it is affected by reflections, the correction module 150 modifies the corresponding pixel in image 102a. The modification of the pixel in image 102a (e.g., taken with flash) is based on the corresponding pixel from image 102b (e.g., taken with a high ISO setting and no flash).

In certain embodiments, the set of aligned images 102 is provided to de-noise module 160. The de-noise module 160 removes noise (e.g., random digital information) from one or more of the images 102a-102c. For example, image 102b (e.g., taken with a high ISO setting) can include noise, such as pixels with random colors and locations that do not represent the subject matter of the photograph. De-noise module 160 compares pixels in image 102b to corresponding pixels in one or more of image 102c (e.g., taken with a low ISO setting) and image 102a (e.g., taken with flash). For example, a comparison of pixel values within a block of image 102b indicates a particular pixel with color values that are different from adjacent pixels. A comparison of pixels values of a corresponding block in image 102c indicates that the corresponding pixel and adjacent pixels have similar color values. Based on this comparison, de-noise module 160 determines that the particular pixel in image 102b is noise. The de-noise module 160 modifies the value of the particular pixel based on the values of the surrounding pixels in image 102b, or the values of the corresponding pixels in 102c, or both.

In certain embodiments, the digital mask 109, image 102a, and image 102b are provided to a color-blending sub-module 170. Additionally or alternatively, the color-blending module 170 receives a de-noised image corresponding to image 102b. Based on the flash-affected pixels indicated in digital mask 109, the color-blending sub-module 170 replaces pixels in image 102a (e.g., taken with flash) with corresponding pixels from image 102b (or the de-noised image corresponding to image 102b), and performs color blending on the replaced pixels. For example, the color-blending sub-module 170 adjusts the color values of the replaced pixels based in part on the color values of other pixels in image 102a (e.g., pixels that were not replaced or otherwise modified). One color-adjustment technique is a Poisson blending algorithm, but other techniques exist.

In additional or alternative embodiments, the correction module 150 provides corrected image 104. The corrected image 104 is based on the modifications to image 102a, as described above. In some embodiments, reflection removal system 100 provides corrected image 104. For example, corrected image 104 is provided as an image that has had unwanted reflections due to camera flash removed.

Figure 2:
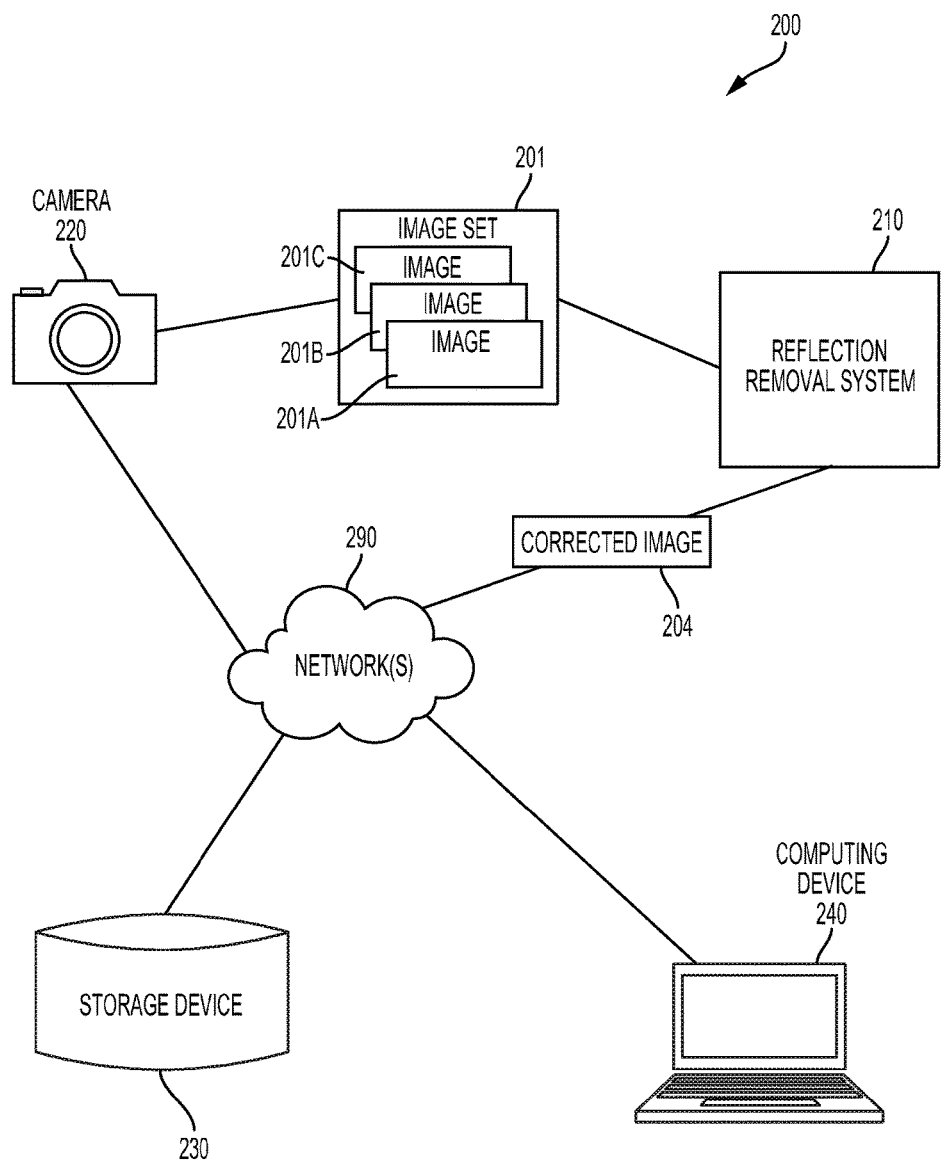
FIG. 2 is a diagram depicting an example of an environment in which a reflection removal system is practiced, according to certain embodiments.

FIG. 2 is a diagram of an exemplary environment 200 in which one or more embodiments of the present disclosure are practiced. The environment 200 includes a reflection removal system 210 and a camera, such as camera 220. In some embodiments, the environment 200 also includes one or more of network 290, a digital storage device, such as storage device 230, and a computing device, such as computing device 240. In certain embodiments, one or more of these elements are included by another of the elements. For example, the camera 220 includes the reflection removal system 210. Additionally or alternatively, computing device 240 includes one or more of reflection removal system 210, storage device 230, or camera 220.

In an embodiment, camera 220 provides a set of images 201 to a reflection removal system 210. In some cases, image set 201 includes digital images having different settings, such as images 201a, 201b, and 201c. The image set 201 is provided via one or more of (without limitation) an internal device connection, network 290, a portable storage device (e.g., a memory key, a digital media card), or using any suitable technique. In some cases, various individual images within set 201 are provided using various different techniques.

The reflection removal system 210 performs one or more techniques to remove reflections related to illumination, such as described regarding FIG. 1, and provides a corrected image 204. In some cases, corrected image 204 is provided with one or more images from image set 201, or with one or more elements generated during removal of reflections (e.g., an aligned image, a greyscale image, a digital mask).

The reflection removal system 210 provides the corrected image 204 (and any additional elements) to one or more receiving devices. The corrected image 204 is provided via one or more of (without limitation) an internal device connection, network 290, a portable storage device (e.g., a memory key, a digital media card), or using any suitable technique. In some embodiments, the receiving device is camera 220. Additionally or alternatively, the receiving device is one or more of camera 220, computing device 240, or storage device 230. In some cases, the corrected image 204 is provided to various receiving device using various techniques. For example, camera 210 receives corrected image 204 via an internal device connection, and storage device 230 receives corrected image 204 via network 290.

Figure 3:
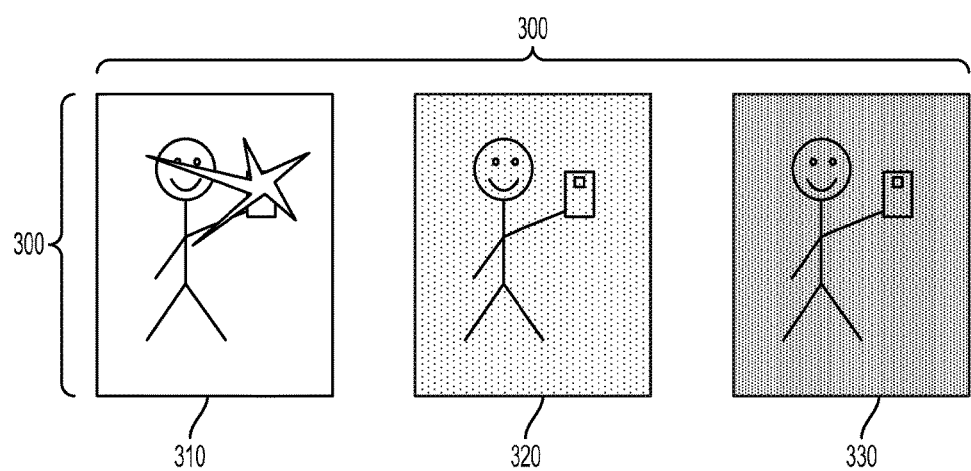
FIG. 3 is a diagram depicting an exemplary set of digital images used by a reflection removal system, according to certain embodiments.

FIG. 3 is a diagram of an exemplary set 300 of digital images used in one or more embodiments disclosed herein. In some embodiments, digital image set 300 includes at least digital image 310 and digital image 320. Additionally or alternatively, digital image set includes digital image 330. The images 310, 320, and 330 depict similar subject matter, but are taken with different camera settings. For example, image 310 is an image with flash, such as an image taken by a camera during activation of an illumination source. Additionally or alternatively, image 320 has a high setting, such as an image taken by a camera with a relatively high ISO setting. Additionally or alternatively, image 330 has a low setting, such as an image taken by a camera with a relatively low ISO setting.

In some embodiments, images such as 310, 320, and 330 are taken sequentially by a same camera. In some cases, the order of the sequence is dependent upon functionality of the camera. In a non-limiting example, a camera takes an image with low ISO first, followed by an image with high ISO, followed by an image with flash. In some embodiments, the images are taken in response to a single user command. Additionally or alternatively, the images are taken at substantially the same time, such as in a period of time short enough that it is unnoticed by a user.

In some embodiments, levels of the relatively high setting and relatively low setting are determined based on the environment of the subject matter when the photos are taken. For example, a reflection removal system (such as described in regards to FIG. 1) determines a level of light around the subject matter (or "ambient light"). Responsive to determining the ambient light, the reflection removal system determines that an additional illumination source (such as a flash) is necessary for appropriate illumination of the subject matter. In some cases, the reflection removal system provides to a camera an indication that flash is necessary. Additionally or alternatively, the reflection removal system determines a sensitivity setting that is low relative to the level of ambient light (e.g., a setting for an underexposed photograph). Additionally or alternatively, the reflection removal system determines a sensitivity setting that is high relative to the level of ambient light (e.g., a setting for an overexposed photograph). Non-limiting examples of determined relative sensitivity settings are an ISO of 200 and an ISO of 800. In some cases, a reflection removal system determines one or more of the settings and provides them to a camera. In some embodiments, some, all, or none of the described determinations are performed by a camera. Images, such as respective images included in digital image set 300, are taken using one or more of the determined settings.

Figure 4:
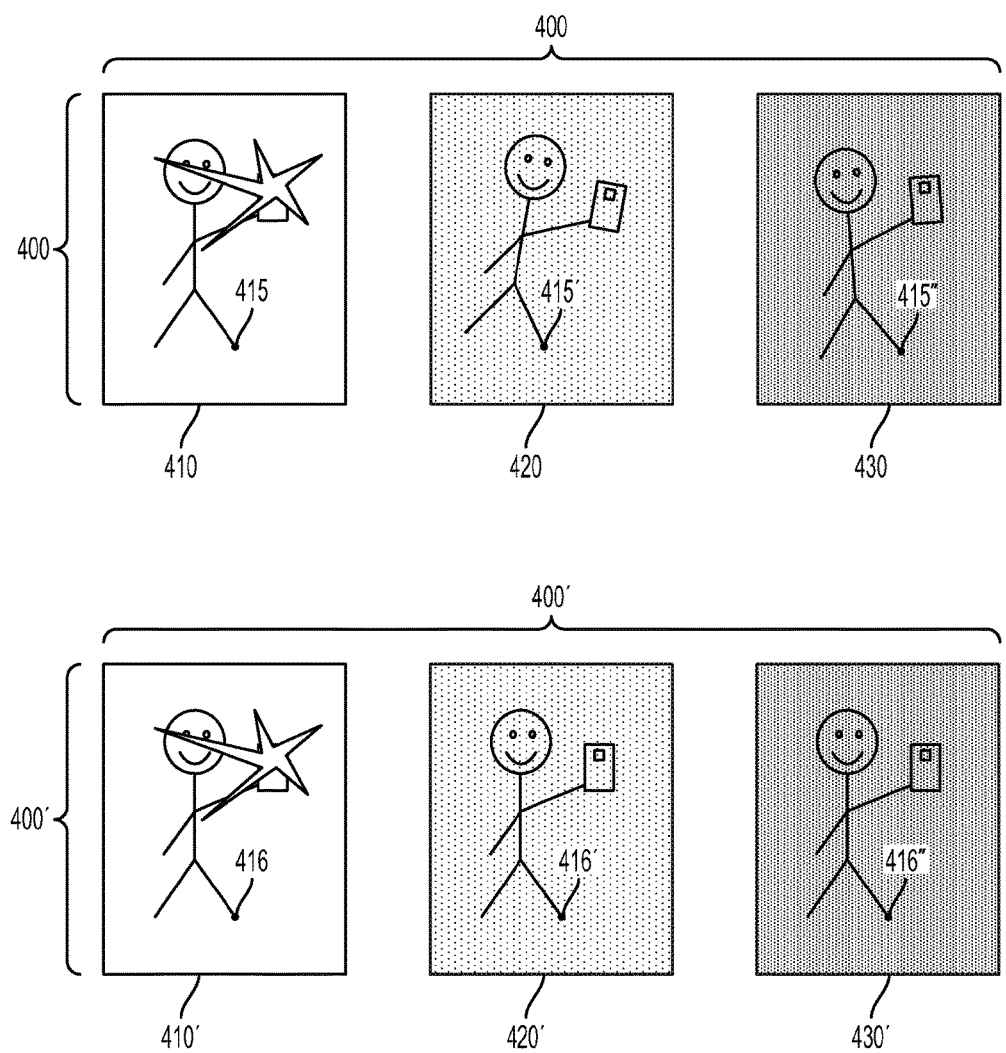
FIG. 4 is a diagram depicting an exemplary set of digital images aligned by a reflection removal system, according to certain embodiments.

FIG. 4 is a diagram of an exemplary set 400 of digital images. Digital image set 400 includes digital images 410, 420, and 430. Each of the digital images 410, 420, and 430 has different settings, as described in regards to FIG. 3. In some embodiments, the alignment of image set 400 is determined. Alignment of the digital image set 400 includes determining whether similar features of the images' content have a similar relative position within each aligned image. Unintentional movement of the photographer may cause features of the subject matter to have a different relative position within each image. For example, a feature of the subject matter (e.g., a person's foot) has a first position 415 in image 410, a second position 415' in image 420, and a third position 415" in image 430.

In some embodiments, the images 410, 420, and 430 are aligned, such as by an alignment module 120. For example, the alignment module uses a feature detection technique to determine that the features having the relative positions 415, 415', and 415" are a same (or similar) feature of the respective images' content. A non-limiting example of a feature detection technique is the Oriented FAST and Rotated BRIEF ("ORB") algorithm, but other feature detection techniques exist. Additionally or alternatively, the alignment module uses an alignment technique to align one or more of the images 410, 420, or 430, to provide a set 400' of aligned images, including aligned digital images 410', 420', and 430'. A non-limiting example of an alignment technique is homography, but other alignment techniques exist. The images included in set 400' are aligned such that the features of the images have a same (or similar) position within each aligned image. For example, the feature having the relative positions 415, 415', and 415" in set 400 has a position 416 in aligned image 410', a similar position 416' in aligned image 420', and a similar position 416" in aligned image 430'.

Figure 5:
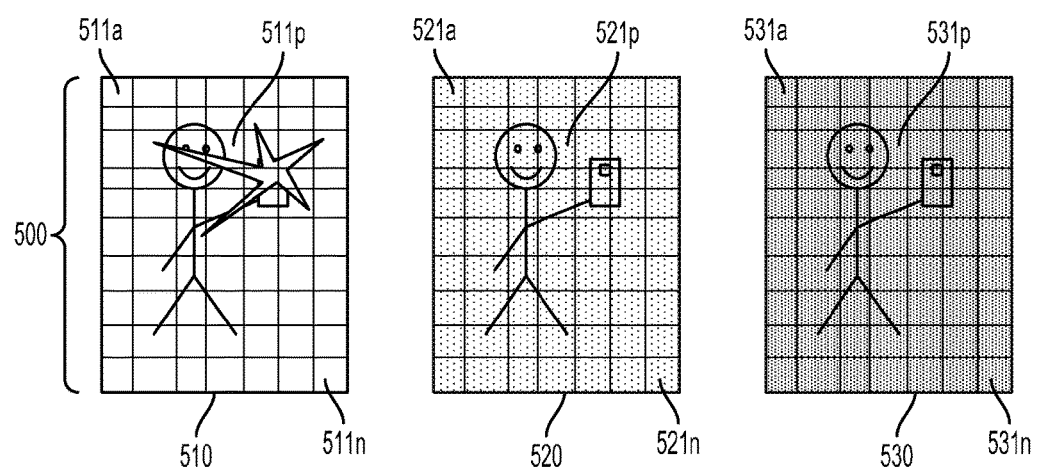
FIG. 5 is a diagram depicting an exemplary set of grayscale digital images, according to certain embodiments.

FIG. 5 is a diagram of an exemplary set 500 of greyscale digital images. Greyscale digital image set 500 includes greyscale images 510, 520, and 530. Each of the greyscale images 510, 520, and 530 has different settings, as described in regards to FIG. 3, or be aligned, as described in regards to FIG. 4, or both. In some embodiments, the greyscale image set 500 is converted to greyscale from a set of color images, such as by a greyscale conversion module 130. For example, the conversion module determines whether one or more images in a received set are in color (e.g., such as a red-green-blue color format). If it is determined that any of the received images are in color, the greyscale conversion module uses color conversion techniques to adjust the images (e.g., such as to a greyscale format).

In some embodiments, the greyscale images are each divided into blocks of pixels. For example, greyscale images 510, 520, and 530 are divided into blocks of pixels 511*a* through 511*n*, 521*a* through 521*n*, and 531*a* through 531*n*, respectively. In some cases, the blocks of pixels are correlated among the greyscale images. For example, the correlated blocks 511*p*, 521*p*, and 531*p* depict a same (or similar) portion of the content of the greyscale images (e.g., a particular area of the background, a similar portion of a person's face). In block 511*p*, a portion of the content is obscured by flash. Blocks 521*p* and 531*p* show the content with, respectively, a relatively high setting and relatively low setting, as described elsewhere herein. Additionally or alternative, pixels included in the blocks are correlated among the blocks. For example, a top left pixel included in block 511*p* is correlated with a top left pixel in each of block 521*p* and 531*p*.

In some cases, each block of the greyscale image set 500 is normalized, such as by the greyscale conversion module 130, or by a mask generation module 140. A non-limiting example of a normalization range has a minimum value of 0 and a maximum value of 1, but any suitable scale or range of values can be used. Pixels included in a normalized block have values falling within the normalization range, such as a very bright pixel (e.g., a solid white area) having a value of 1, or a very dark pixel (e.g., a solid black area) having a value of 0. For example, block 511*p* includes pixels with very high values indicating a very bright area (e.g., a brightly lit area), and additional pixels with very low values indicating a very dark area (e.g., a shadowed background area). Normalized blocks based on respective blocks 511*p*, 521*p*, and 531*p* include pixels with values falling within the normalization range.

Figure 6:
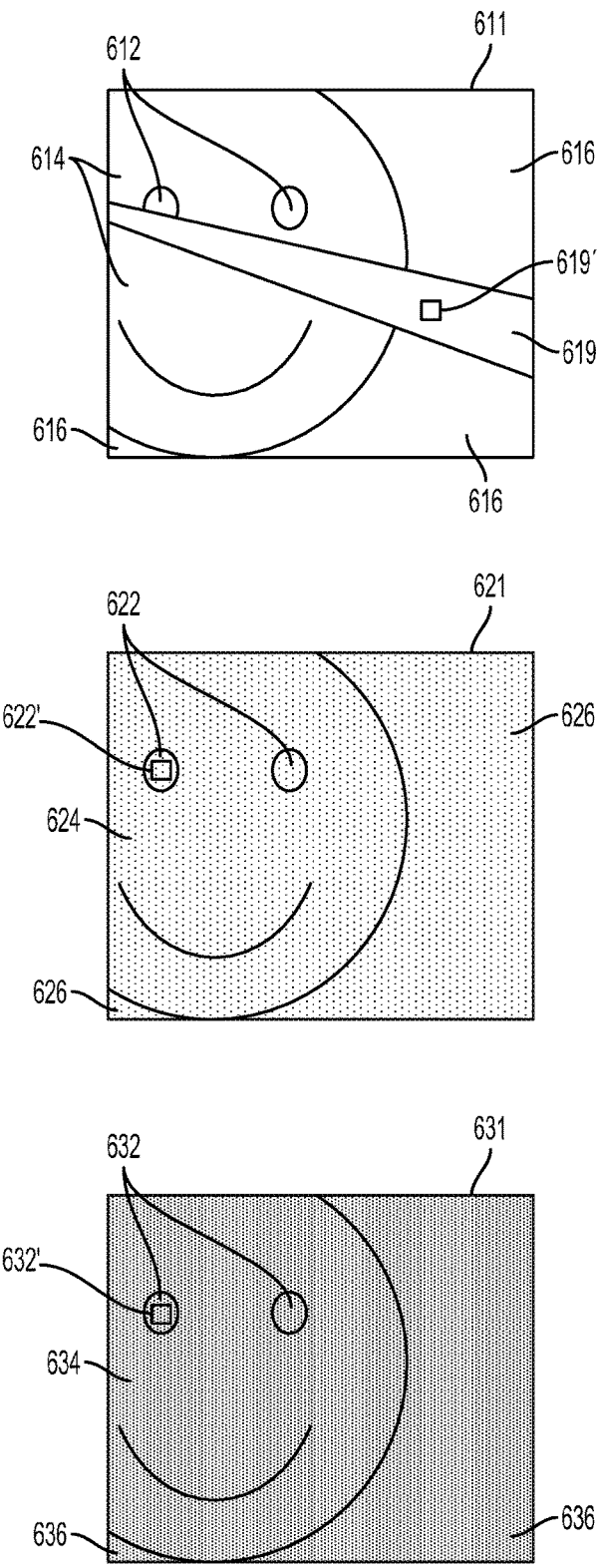
FIG. 6 is a diagram depicting an example of normalized blocks based on blocks from a set of grayscale digital images, according to certain embodiments.

FIG. 6 is a diagram of exemplary normalized blocks 611, 621, and 631. The normalized blocks are based on blocks from greyscale digital images, as described in regards to FIG. 5. Block 611 is included in an image taken with flash. Block 621 is included in an image having a relatively high setting. Block 631 is included in an image having a relatively low setting. The blocks 611, 621, and 631 are correlated, such that they depict a same (or similar) portion of the content of the greyscale images. Additionally or alternatively, pixels included in the correlated blocks are also correlated. In block 611, a portion of the content is obscured by flash (e.g. area 619). Blocks 621 and 631 show the content with, respectively, a relatively high setting and relatively low setting. Blocks 611, 621, and 631 each include pixels, and each pixel has a respective value falling within the normalization range.

Related to block 611, pixels in area 612 (e.g., a person's eyes) have high values relative to other pixels in block 611, pixels in area 614 (e.g., a person's skin) have intermediate values relative to other pixels in block 611, and pixels in area 616 (e.g., a background) have low values relative to other pixels in block 611. Pixels in area 619 (e.g., glare caused by flash) have values higher than the values of 612, 614, or 616.

Related to block 621, pixels in area 622 have high values relative to other pixels in block 621, pixels in area 624 have intermediate values relative to other pixels in block 621, and pixels in area 626 have low values relative to other pixels in block 621.

Related to block 631, pixels in area 632 have high values, pixels in area 634 have intermediate values relative to other pixels in block 631, and pixels in area 636 have low values relative to other pixels in block 631.

In an embodiment, a threshold value is determined, such as by mask generation module 140. The threshold value is determined based on a comparison of pixels within a block, or on a comparison of correlated pixels, or both. For example, the threshold value is determined based on a comparison of pixels included in block 621. Additionally or alternatively, the threshold value is verified based on a comparison between corresponding pixels, such as by comparing pixels in block 621 (e.g., having a relatively high setting) with corresponding pixels in block 631 (e.g., having a relatively low setting).

Comparison of pixels included in the blocks is based on values of the respective pixels. For example, within each block, the value of each pixel is compared to the value of each other pixel in the particular block. Based on this comparison, at least one pixel having a maximum value within the particular block is determined. For example, a first pixel 619' having a first maximum value is determined in block 611, located in area 619. A second pixel 622' having a second maximum value is determined in block 621, located in area 622. A third pixel 632' having a third maximum value is determined in block 631, located in area 632. Since the subject matter of blocks 611, 621, and 631 is similar, it is expected that the pixels having the maximum values are corresponding pixels having similar content (e.g., the whites of a person's eyes). However, it is possible that the first maximum value is associated with an area (such as area 619) that is affected by flash.

In some embodiments, the threshold value is determined based on the values of one or more pixels. Since block 621 is from a digital image having a relatively high setting but taken without flash, it is expected that the second pixel 622' in block 621 is the pixel having the brightest value associated with the content of the set of digital images. In some cases, the threshold value is determined based on the second maximum value in block 621. For example, the threshold value is determined to be equivalent to the second maximum value of the pixel 622'.

In some embodiments, the threshold value is verified by an additional comparison with an additional pixel in block 631. For example, the second pixel 622' having the second maximum value is compared to a corresponding pixel in block 631. Since the subject matter of blocks 611, 621, and 631 is similar, it is expected that the corresponding pixel in block 631 has the third maximum value (e.g., the corresponding pixel is the third pixel 632' having the third maximum value). If the corresponding pixel has a value different from the third maximum value, it is determined that the second maximum value is not associated with the content of the set of digital images (e.g., second pixel 622' is affected by digital noise). In some cases, based on determining that the second maximum value is not associated with the content, the threshold value is based on a value of a different pixel (e.g., an additional pixel in block 621 having the highest value associated with the content).

Figure 7:
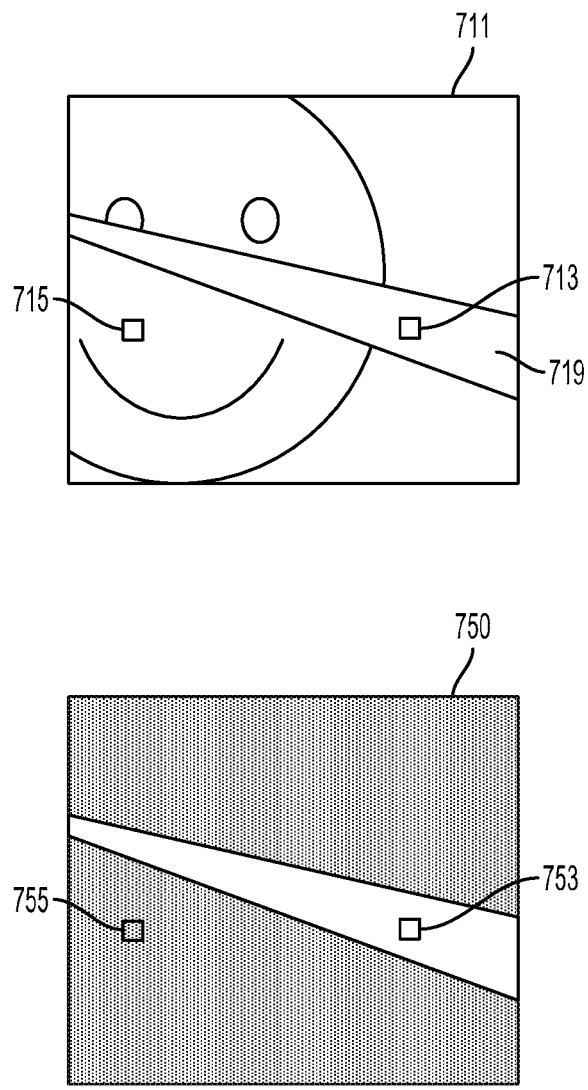
FIG. 7 is a diagram depicting an example of a digital mask, according to certain embodiments.

FIG. 7 is a diagram of an exemplary digital mask 750, such as mask generated by mask generation module 140. Exemplary block 711 is a normalized block based on a block from a greyscale digital image, as described elsewhere herein. Block 711 is from an image taken with flash, such that an area 719 is a portion of the image content obscured by flash.

In some embodiments, the digital mask 750 is generated based on a threshold value, such as a threshold value determined as described in regards to FIG. 6. Additionally or alternatively, the digital mask is based on a comparison of the threshold value to pixel values. For example, each pixel included in digital mask 750 has an assigned value that is determined based on a comparison of the threshold value to a corresponding pixel in block 711. A first pixel 715 included in block 711 is compared to the threshold value. Based on the comparison, it is determined that pixel 715 has a value that is equal or less than the threshold value. Based on such determination, first corresponding pixel 755 in digital mask 750 is assigned a first value. In some cases, the first assigned value is a minimum value, or a value indicating a first color (e.g., black), or both. Additionally or alternatively, a pixel 713 included in block 711 is compared to the threshold value. Based on the comparison, it is determined that pixel 713 has a value that is greater than the threshold value (e.g., pixel 713 is affected by flash). Based on such determination, a second corresponding pixel 753 in digital mask 750 is assigned a second value. In some cases, the second assigned value is a maximum value, or a value indicating a second color (e.g., white), or both. In some cases, the minimum and maximum values are based on a type of file format of the digital mask. For example, if digital mask 750 has a black-and-white bitmap file format, the minimum and maximum values are 0 and 1, respectively. If digital mask 750 has a greyscale bitmap file format, the respective minimum and maximum values are 0 and 255, respectively.

Figure 8:
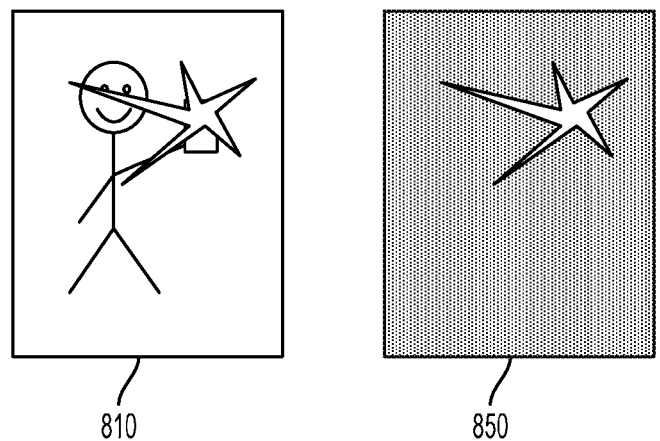
FIG. 8 is a diagram depicting an example of a digital mask, according to certain embodiments.

In some cases, a digital mask is related to one or more digital images that are comprised of blocks. FIG. 8 is a diagram of an exemplary digital mask 850, that related to digital image 810. Digital image 810 is divided into blocks and compared to other digital images divided into blocks, as described elsewhere herein. Each block of image 810 has a particular threshold, and a particular digital mask based on the particular threshold. In some cases, the digital mask 850 comprises each of the particular digital masks related to the blocks of digital image 810.

In some embodiments, an image having a relatively high setting is providing to a de-noise module, such as de-noise module 160. The de-noise module removes digital noise from the image with the relatively high setting. In some cases, the removal of noise is based on an additional image having a relatively low setting.

Figure 9:
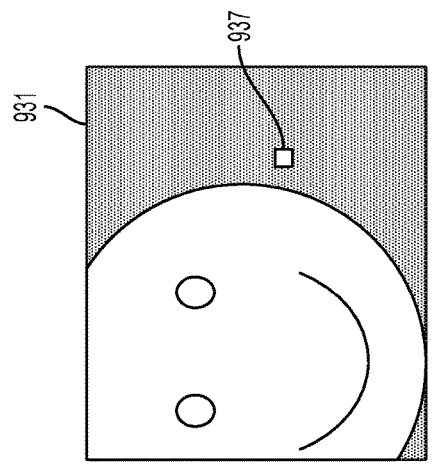
FIG. 9 is a diagram depicting an example of blocks including digital noise, according to certain embodiments.
Figure 9:
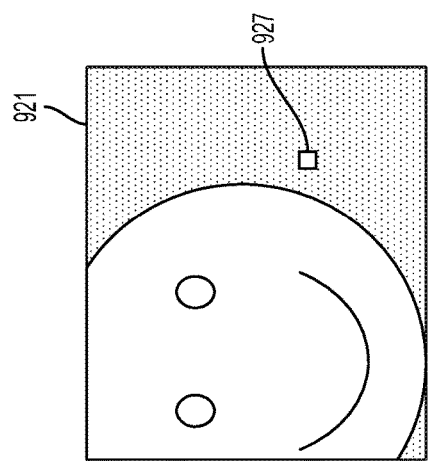
Figure 9:
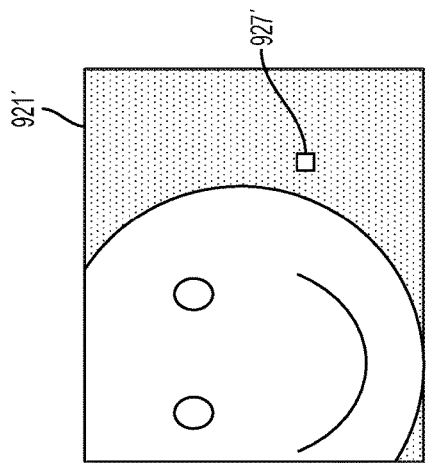

FIG. 9 is a diagram of exemplary blocks 921 and 931. The blocks 921 and 931 are included in aligned digital images, as described in regards to FIG. 4. The blocks 921 and 931 are from color images, grayscale images, or another suitable format. Block 921 is included in an image having a relatively high setting. Block 931 is included in an image having a relatively low setting. The blocks 921 and 931 are correlated, such that they depict a same (or similar) portion of the content of the aligned images. Additionally or alternatively, pixels included in the correlated blocks are also correlated. Each pixel included in blocks 921 or 931 has one or more values indicating a color value of the pixel (or a grayscale value of the pixel).

In some embodiments, a de-noise module receives the aligned digital images including blocks 921 and 931. Blocks 921 and 931 show the content of the images with, respectively, a relatively high setting and relatively low setting. In some cases, block 921 includes noise, such as digital noise caused by a high light sensitivity setting. The noise includes pixels with positions or color values that are unrelated to the content of the image. For example, pixel 927 has a color value that is unrelated to the image content in the adjacent area of block 921 (e.g., a background area).

In some cases, the de-noise module removes or corrects noise in block 921 based on block 931. For example, the de-noise module compares the color values of each pixel in block 921 to adjacent pixels. Based on the comparison, a determination is made that pixel 927 has color values different from adjacent pixels. Additionally or alternatively, the determination is based on a threshold indicating a level of difference between the particular pixel and the adjacent pixels.

Responsive to determining that pixel 927 has values different from those of the adjacent pixels, the de-noise module compares pixel 927 to corresponding pixel 937 included in block 931. For example, the de-noise module determines that corresponding pixel 937 has color values similar to those of corresponding adjacent pixels. Based on this comparison, the de-noise module determines that pixel 927 is noise. In some cases, the de-noise module modifies the color values of pixel 927 to be similar to values of the adjacent pixels in block 921. Additionally or alternatively, the modification of pixel 927 is based on a relationship between the corresponding pixel 937 and the corresponding adjacent pixels. For example, if corresponding pixel 937 has a color value 3% brighter than the corresponding adjacent pixels, pixel 927 is modified to have a color value 3% brighter than the adjacent pixels in block 921. In some embodiments, the de-noise module provides a corrected block 921'. In the corrected block 921', corrected pixel 927' has color values similar to those of the adjacent pixels.

Figure 10:
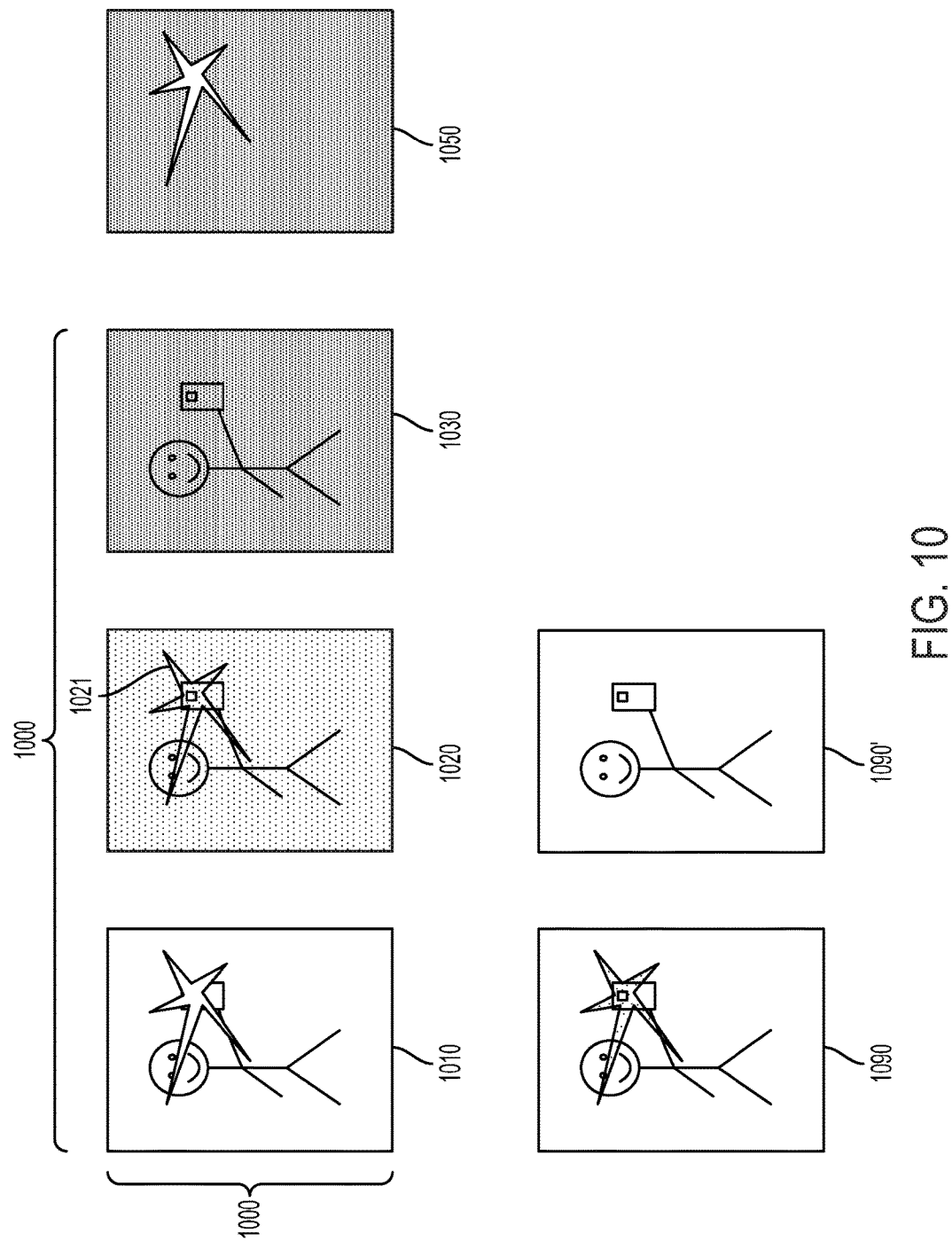
FIG. 10 is a diagram depicting examples of digital images, a digital mask, and a corrected digital image, according to certain embodiments.

In some cases, a correction module, such as correction module 150, provides a corrected image having unwanted flash glare removed. Additionally or alternatively, the correction module provides the corrected image based on a received set of images and a received digital mask. FIG. 10 is a diagram of an exemplary set 1000 of digital images, and an exemplary digital mask 1050. Digital image set 1000 includes images that are aligned, de-noised, or both. The set 1000 includes digital image 1010 taken with flash, digital image 1020 having a relatively high setting, and digital image 1030 having a relatively low setting. The digital mask 1050 is provided using techniques described elsewhere herein.

In an embodiment, the correction module provides a corrected image 1090 based on flash-affected image 1010. The correction module determines one or more flash-affected pixels in image 1010 based on the flash mask 1050. Based on the determination of which pixels are affected by flash, the correction module selects one or more pixels from image 1020, such that the selected pixels correspond to the flash-affected pixels of image 1010. For example, the correction module selects a region of pixels 1021 from image 1020. The selected region 1021 is combined with the unaffected pixels from image 1010 to create a corrected image 1090. The correction module provides the corrected image 1090. Additionally or alternatively, the color values of the affected pixels are adjusted based on the color values of the selected pixels.

In some embodiments, the corrected image 1090 is provided to a color-blending module, such as color blending module 170. The color-blending module blends the pixels corresponding to image 1010 with the pixels corresponding to the region 1021. For example, the color blending module uses a color-adjustment technique, such as a Poisson blending algorithm, to adjust the pixels corresponding to region 1021. Adjusting the pixels corresponding to region 1021 includes modifying the color values of the pixels to visually blend with the surrounding pixels corresponding to image 1010, such that a person viewing the color-blended image is less likely to notice differences in color. For example, the modification of the color values of pixels in region 1021 is further based on the color values of pixels adjacent or nearby the region 1021. The color-blended image 1090' results from modifying the corrected image 1090 using color-blending techniques.

In some embodiments, the correction module provides the corrected image 1090, or color-blended image 1090'. In some cases, the provided image is received by a computing device, a storage device, a camera, or another suitable system. Additionally or alternatively, the provided image is displayed on a display device, such as a display screen associated with a computing device.

Figure 11:
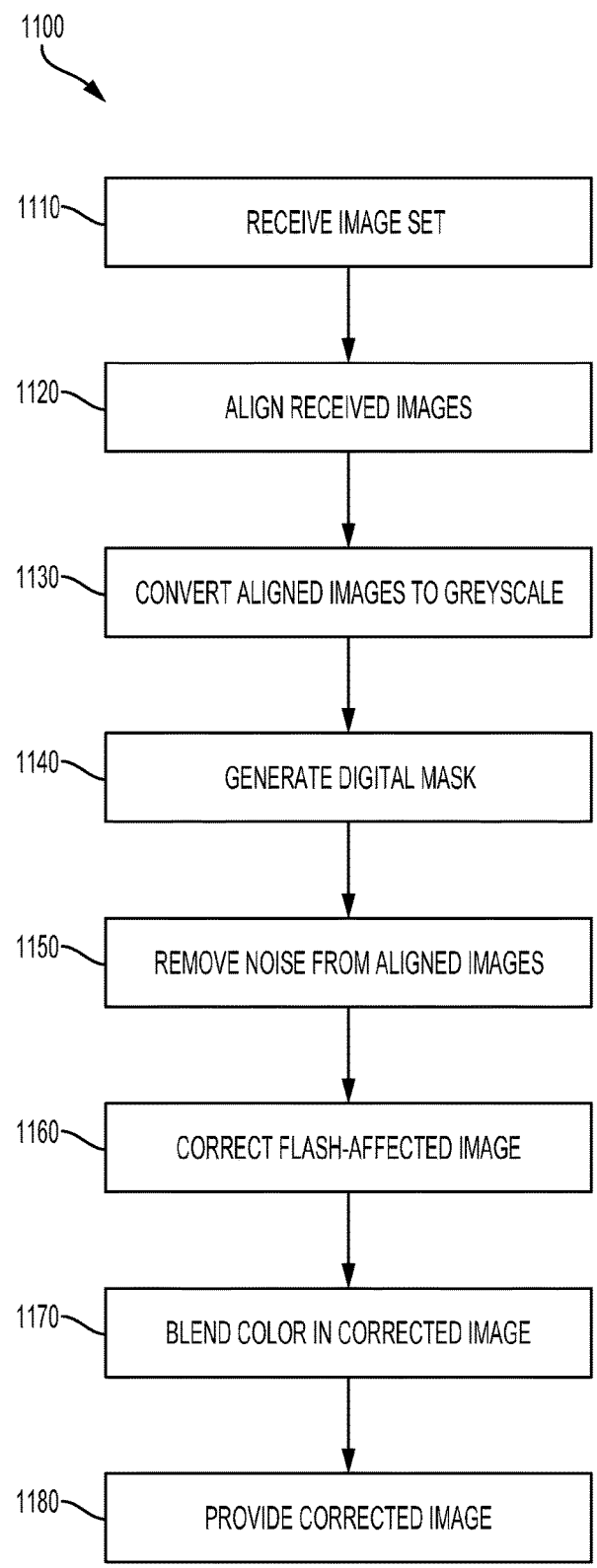
FIG. 11 is a flow chart depicting an example of a process for automatically removing reflections due to flash glare from an image, according to certain embodiments.

FIG. 11 is a flow chart depicting an example of a process 1100 for automatically removing reflections due to flash glare from an image. In some embodiments, such as described in regards to FIGS. 1-10, a computing device executing a reflection removal system implements operations described in FIG. 11, by executing suitable program code. For illustrative purposes, the process 1100 is described with reference to the examples depicted in FIGS. 1-10. Other implementations, however, are possible.

At block 1110, the process 1100 involves receiving a set of images. In some cases, the images included in the set depict similar subject matter, and are captured by a camera at substantially a same time. The set includes an image taken with flash, an image with a relatively high sensitivity setting, and an image with a relatively low sensitivity setting.

At block 1120, the process 1100 involves aligning the received images. For example, an alignment module performs feature detection and alignment techniques, as described at least in regards to FIGS. 1 and 4. In some embodiments, operations related to block 1120 are omitted, such as if the received images are already aligned.

At block 1130, the process 1100 involves converting the aligned images to grayscale. For example, a grayscale conversion module modifies the aligned images such that the color values of the aligned images are modified to grayscale, as described at least in regards to FIGS. 1 and 5. Additionally or alternatively, the grayscale images are divided into blocks of pixels, and pixels values within each block are normalized, such as by modifying the pixel values to fall within a range of 0-1. In some embodiments, operations related to block 1130 are omitted, such as if the aligned images are already grayscale, or already normalized.

At block 1140, the process 1100 involves generating a digital mask based on the grayscale images. For example, a mask generation module determines a threshold value for each block within the images. Additionally or alternatively, the mask generation module assigns a value to each pixel in the generated mask, such that each particular assigned value is based on a comparison of the threshold value to a particular corresponding pixel in the grayscale image affected by flash.

At block 1150, the process 1100 involves removing noise from one or more of the aligned images. For example, a de-noise module compares each pixel in the aligned image having the high sensitivity setting to a corresponding pixel in the aligned image having the low sensitivity setting. Based on the comparison, the de-noise module adjusts a value of a pixel in the aligned image with the high sensitivity setting. In some cases, the aligned images that are compared by the de-noise module are color images.

At block 1160, the process 1100 involves providing a corrected image based on the aligned images and the digital mask. For example, a correction module selects pixels from the aligned image having the high sensitivity setting, based on values of corresponding pixels in the digital mask. Additionally or alternatively, the correction module combines the selected pixels with pixels from the aligned image with flash. In some cases, one or more of the aligned images have had noise removed, such as by operations related to block 1150.

At block 1170, the process 1100 involves adjusting the values of pixels in the corrected image, such as by a color-blending module. For example, the color-blending module uses a Poisson blending technique to modify color values of the selected region of pixels to visually correspond with pixels from the aligned image with flash. In some embodiments, operations related to block 1170 are omitted.

At block 1180, the process 1100 involves providing the corrected image. In some cases, the provided image is a color-blended image, such as by operations related to block 1170. The provided image is displayed to a user of the reflection removal system, such as on a display device.

Additionally or alternatively, the provided image is received by a storage device, such as a database or cloud storage system.

Figure 12:
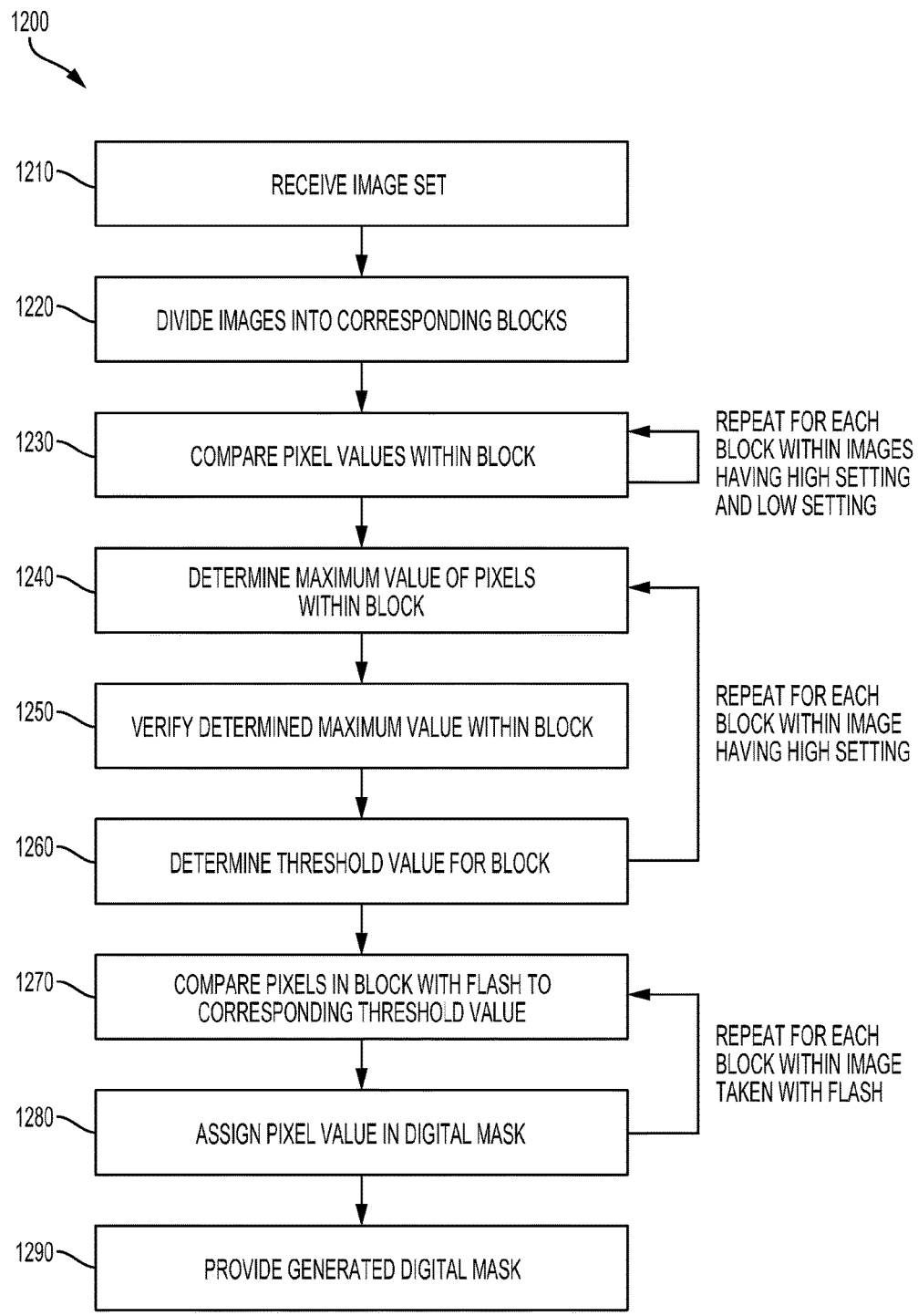
FIG. 12 is a flow chart depicting an example of a process for generating a digital mask, according to certain embodiments.

FIG. 12 is a flow chart depicting an example of a process 1200 for generating a digital mask. In some embodiments, such as described in regards to FIGS. 1-11, a computing device executing a mask generation module implements operations described in FIG. 12, by executing suitable program code. For illustrative purposes, the process 1200 is described with reference to the examples depicted in FIGS. 1-11. Other implementations, however, are possible.

At block 1210, the process 1200 involves receiving a set of aligned normalized grayscale images, such as from a grayscale conversion module. In some cases, the greyscale images included in the set depict similar subject matter, and are based on digital images captured by a camera at substantially a same time. The set includes greyscale images based on an image taken with flash, an image with a relatively high sensitivity setting, and an image with a relatively low sensitivity setting.

At block 1220, the process 1200 involves dividing the images into blocks of pixels. A block includes a region of pixels in a particular one of the images. In some embodiments, the blocks correspond among the images, such that a set of corresponding blocks depicts similar subject matter. Additionally or alternatively, each block has settings associated with the image in which it is included, such as a block with flash included in the image with flash, a block with a high setting included in the image with the high setting, and a block with a low setting included in the image with the low setting.

At block 1230, the process 1200 involves comparing values of pixels included in a block. Within a particular block, the mask generation module compares a color value (e.g., a value indicating a greyscale level) of each pixel with each other pixel included in the block. For example, the mask generation module compares the color values of each pixel included in a particular block with the high sensitivity setting. In some embodiments, operations related to block 1230 are repeated for each block included in the image with the high sensitivity setting. Additionally or alternatively, operations related to block 1230 are repeated for each block included in the image with the low sensitivity setting.

At block 1240, the process 1200 involves determining the maximum value of the pixels included in the particular block. For example, the mask generation module determines the maximum value for a block based on the grayscale values of the pixels included in that block, as described at least in regards to FIGS. 1 and 6-8.

At block 1250, the process 1200 involves verifying the determined maximum value for the particular block. For example, pixel having a maximum value in the block with the high sensitivity setting is compared to a corresponding pixel in the block with the low sensitivity setting. If the corresponding pixel does not have the maximum value for the block with the low sensitivity setting, the maximum value for the block with a high sensitivity setting is adjusted, as described at least in regards to FIG. 6. In some embodiments, operations related to block 1250 are omitted.

At block 1260, the process 1200 involves determining a threshold value based on the maximum value, or the verified maximum value, for the block with a high sensitivity setting. In some embodiments, operations related to blocks 1240, 1250, and 1260 are repeated for each block included in the image with the high sensitivity setting.

At block 1270, the process 1200 involves comparing a block with flash with the threshold value for the corresponding block with the high sensitivity setting. For example, the mask generation module compares each pixel included in the block with flash against the corresponding threshold value. Additionally or alternatively, the mask generation module determines whether a value of each pixel is greater than the threshold value, or equal or less than the threshold value.

At block 1280, process 1200 involves assigning a value to a pixel included in a digital mask, based on the comparison of the block with flash to the corresponding threshold value. For example the mask generation module assigns a value to a pixel in the digital mask based on the determination that a corresponding pixel in the block with flash has a value greater than the threshold value. In some embodiments operations related to blocks 1270 and 1280 are repeated for each block included in the image with flash.

At block 1290, process 1200 involves providing the generated digital mask. For example, the digital mask is received by a correction module, as described at least in regards to FIG. 1. In some cases, the digital mask is provided as an output from the mask generation module. Additionally or alternatively, the digital mask is provided via a network connection, such as if the mask generation module and correction module operate on separate computing systems.

Figure 13:
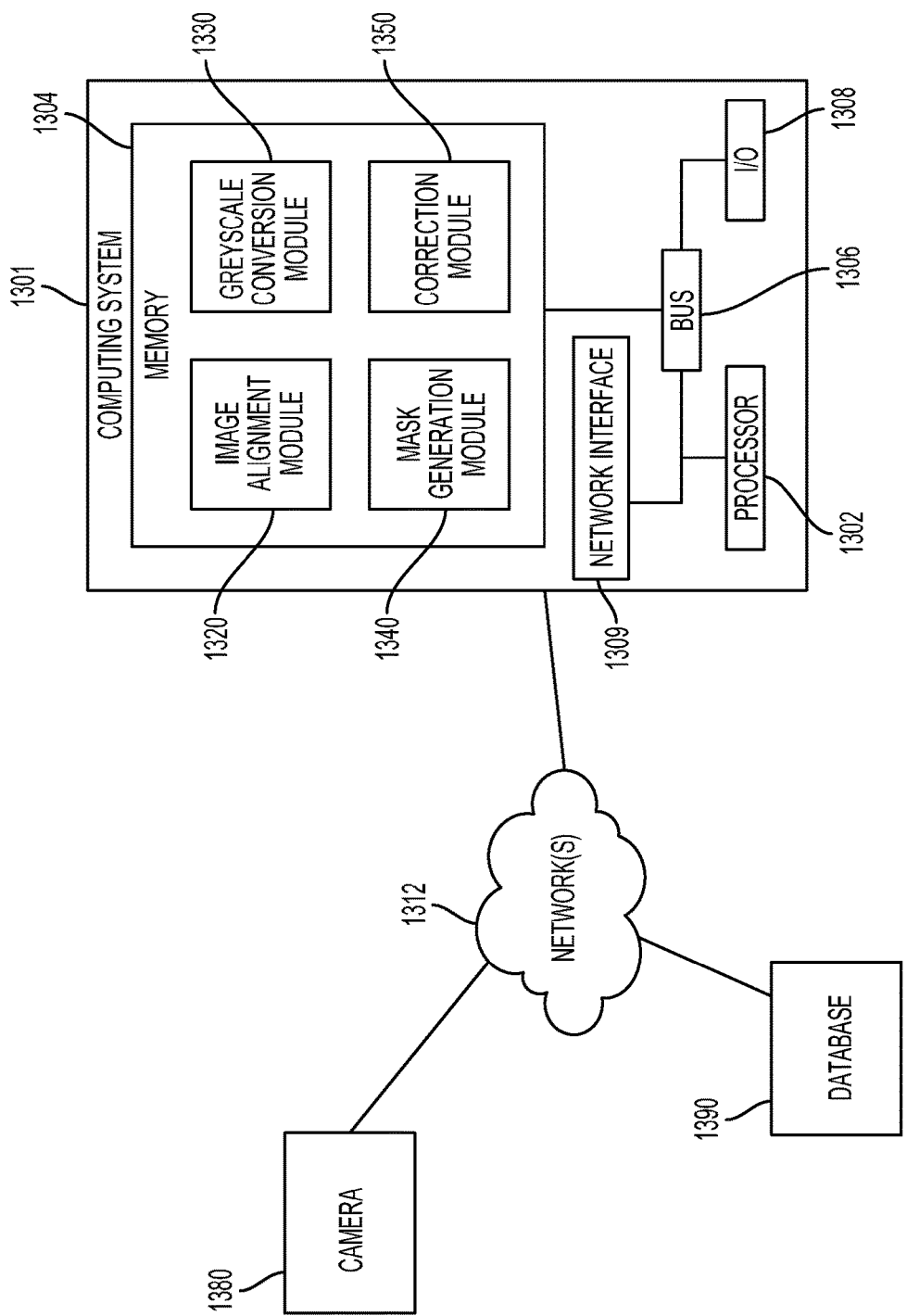
FIG. 13 is a diagram depicting an example of a computing system for implementing a reflection removal system, according to certain embodiments.

Any suitable computing system or group of computing systems can be used for performing the operations described herein. For example, FIG. 13 is a block diagram depicting an example implementation of a reflection removal system, according to certain embodiments.

The depicted example of a computing system 1301 includes one or more processors 1302 communicatively coupled to one or more memory devices 1304. The processor 1302 executes computer-executable program code or accesses information stored in the memory device 1304. Examples of processor 1302 include a microprocessor, an application-specific integrated circuit ("ASIC"), a field-programmable gate array ("FPGA"), or other suitable processing device. The processor 1302 includes any number of processing devices, including one.

The memory device 1304 includes any suitable non-transitory computer-readable medium for storing any of the image alignment module 1320, greyscale conversion module 1330, mask generation module 1340, correction module 1350, and other received or determined data. The computer-readable medium includes any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device reads instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1301 also includes a number of external or internal devices such as input or output devices. For example, the computing system 1301 is shown with an input/output ("I/O") interface 1308 that receives input from input devices or provide output to output devices. A bus 1306 can also be included in the computing system 1301. The bus 1306 communicatively couples one or more components of the computing system 1301.

The computing system 1301 executes program code that configures the processor 1302 to perform one or more of the operations described above with respect to FIGS. 1-12. The program code includes operations related to, for example, one or more of the image alignment module 1320, greyscale conversion module 1330, mask generation module 1340, correction module 1350, or other suitable modules or memory structures that perform one or more operations described herein. The program code may be resident in the memory device 1304 or any suitable computer-readable medium and may be executed by the processor 1302 or any other suitable processor. In some embodiments, the program code described above is stored in the memory device 1304, as depicted in FIG. 13. In additional or alternative embodiments (not depicted in FIG. 13), one or more of the image alignment module 1320, greyscale conversion module 1330, mask generation module 1340, correction module 1350, and the program code described above are stored in one or more memory devices accessible via a data network, such as a memory device accessible via a cloud service.

The computing system 1301 depicted in FIG. 13 also includes at least one network interface 1309. The network interface 1309 includes any device or group of devices suitable for establishing a wired or wireless data connection to one or more data networks 1312. Non-limiting examples of the network interface 1309 include an Ethernet network adapter, a modem, and/or the like. The computing system 1301 is able to communicate with one or more of the camera 1380 and the database 1390 using the network interface 1309.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or di splay devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of removing light reflections from a digital photograph, the method comprising operations performed by a processor, wherein the operations comprise:
    receiving a first digital image having a first pixel and a second digital image having a second pixel, the first digital image produced by a camera having an activated illumination source during production of the first digital image, the second digital image produced by the camera having a setting indicating a high sensitivity to ambient light during production of the second digital image;
    creating a digital mask having a mask pixel that corresponds to the first pixel;
    determining, based on a comparison between the first pixel and the second pixel, that the first pixel represents an image of reflected light from the illumination source;
    based on the determination, assigning a value to the mask pixel, wherein the assigned value indicates that the first pixel represents an image of reflected light;
    selecting the second pixel based on the assigned value of the mask pixel;
    adjusting a color value of the first pixel based on the second pixel; and
    providing a modified digital image based on the first digital image and the adjusted color value of the first pixel.

2. The method of claim 1, the operations further comprising:
receiving a third digital image having a third pixel, the third digital image produced by the camera having a setting indicating a low sensitivity to ambient light during production of the third digital image;
    wherein comparing the first pixel to the second pixel is based in part on the third pixel.

3. The method of claim 2, wherein the comparison between the first pixel and the second pixel further comprises:
    determining a first block of pixels from the first digital image, the first block of pixels including the first pixel;

determining a second block of pixels from the second digital image, the second block of pixels including the second pixel;

normalizing a value of the second pixel, wherein the normalized value is normalized with respect to all other pixels in the second block, and comparing the normalized value of the second pixel to normalized values of all other pixels in the second block;

based on the comparison of the normalized values of the second block, determining that the normalized value of the second pixel is the maximum normalized value for the second block;

indicating that the normalized value of the second pixel is a threshold value for the second block; and comparing a value of the first pixel to the threshold value.

4. The method of claim 3, wherein determining that the normalized value of the second pixel is the maximum normalized value for the second block further comprises:

determining a third block of pixels from the third digital image, the third block of pixels including the third pixel;

normalizing a value of the third pixel, wherein the value is normalized with respect to all other pixels in the third block, and comparing the normalized value of the third pixel to normalized values of all other pixels in the third block;

based on the comparison of the normalized values in the third block, determining that the normalized value of the third pixel is the maximum normalized value for the third block;

determining that the second pixel having the maximum normalized value for the second block corresponds to the third pixel having the maximum normalized value for the third block.

5. The method of claim 1, wherein adjusting the color value of the first pixel based on the second pixel further comprises:

comparing the second pixel to adjacent pixels in second image;

determining that an additional color value of the second pixel is related to subject matter of the second image; and adjusting the color value of the first pixel based on the additional color value of the second pixel.

6. The method of claim 1, wherein adjusting the color value of the first pixel is further based on additional color values of adjacent pixels in the first image.

7. The method of claim 1, the operations further comprising aligning the first digital image with the second digital image, such that photographic content indicated by the first pixel is similar to photographic content indicated by the second pixel.

8. A non-transitory computer-readable medium embodying program code for removing light reflections from a digital photograph, the program code comprising instructions which, when executed by a processor, cause the processor to perform operations comprising:

receiving a first digital image having a first pixel and a second digital image having a second pixel, the first digital image produced by a camera having an activated illumination source during production of the first digital image, the second digital image produced by the camera having a setting indicating a high sensitivity to ambient light during production of the second digital image;

creating a digital mask having a mask pixel that corresponds to the first pixel;

determining, based on a comparison between the first pixel and the second pixel, that the first pixel represents an image of reflected light from the illumination source;

based on the determination, assigning a value to the mask pixel, wherein the assigned value indicates that the first pixel represents an image of reflected light;

selecting the second pixel based on the assigned value of the mask pixel;

adjusting a color value of the first pixel based on the second pixel; and providing a modified digital image based on the first digital image and the adjusted color value of the first pixel.

9. The non-transitory computer-readable medium of claim 8, the operations further comprising:

receiving a third digital image having a third pixel, the third digital image produced by the camera having a setting indicating a low sensitivity to ambient light during production of the third digital image;

wherein comparing the first pixel to the second pixel is based in part on the third pixel.

10. The non-transitory computer-readable medium of claim 9, wherein the comparison between the first pixel and the second pixel further comprises:

determining a first block of pixels from the first digital image, the first block of pixels including the first pixel;

determining a second block of pixels from the second digital image, the second block of pixels including the second pixel;

normalizing a value of the second pixel, wherein the normalized value is normalized with respect to all other pixels in the second block, and comparing the normalized value of the second pixel to normalized values of all other pixels in the second block;

based on the comparison of the normalized values of the second block, determining that the normalized value of the second pixel is the maximum normalized value for the second block;

indicating that the normalized value of the second pixel is a threshold value for the second block; and comparing a value of the first pixel to the threshold value.

11. The non-transitory computer-readable medium of claim 10, wherein determining that the normalized value of the second pixel is the maximum normalized value for the second block further comprises:

determining a third block of pixels from the third digital image, the third block of pixels including the third pixel;

normalizing a value of the third pixel, wherein the value is normalized with respect to all other pixels in the third block, and comparing the normalized value of the third pixel to normalized values of all other pixels in the third block;

based on the comparison of the normalized values in the third block, determining that the normalized value of the third pixel is the maximum normalized value for the third block;

determining that the second pixel having the maximum normalized value for the second block corresponds to the third pixel having the maximum normalized value for the third block.

12. The non-transitory computer-readable medium of claim 8, wherein adjusting the color value of the first pixel based on the second pixel further comprises:
   comparing the second pixel to adjacent pixels in second image;
   determining that an additional color value of the second pixel is related to subject matter of the second image; and
   adjusting the color value of the first pixel based on the additional color value of the second pixel.

13. The non-transitory computer-readable medium of claim 8, wherein adjusting the color value of the first pixel is further based on additional color values of adjacent pixels in the first image.

14. The non-transitory computer-readable medium of claim 8, the operations further comprising aligning the first digital image with the second digital image, such that photographic content indicated by the first pixel is similar to photographic content indicated by the second pixel.

15. A system for removing light reflections from a digital photograph, the system comprising a processor configured for:
   receiving a first digital image having a first pixel and a second digital image having a second pixel, the first digital image produced by a camera having an activated illumination source during production of the first digital image, the second digital image produced by the camera having a setting indicating a high sensitivity to ambient light during production of the second digital image;
   creating a digital mask having a mask pixel that corresponds to the first pixel;
   determining, based on a comparison between the first pixel and the second pixel, that the first pixel represents an image of reflected light from the illumination source;
   based on the determination, assigning a value to the mask pixel, wherein the assigned value indicates that the first pixel represents an image of reflected light;
   selecting the second pixel based on the assigned value of the mask pixel;
   adjusting a color value of the first pixel based on the second pixel; and
   providing a modified digital image based on the first digital image and the adjusted color value of the first pixel.

16. The system of claim 15, the processor further configured for:
   receiving a third digital image having a third pixel, the third digital image produced by the camera having a setting indicating a low sensitivity to ambient light during production of the third digital image;
   wherein comparing the first pixel to the second pixel is based in part on the third pixel.

17. The system of claim 16, wherein the comparison between the first pixel and the second pixel further comprises:
   determining a first block of pixels from the first digital image, the first block of pixels including the first pixel;
   determining a second block of pixels from the second digital image, the second block of pixels including the second pixel;
   normalizing a value of the second pixel, wherein the normalized value is normalized with respect to all other pixels in the second block, and
   comparing the normalized value of the second pixel to normalized values of all other pixels in the second block;
   based on the comparison of the normalized values of the second block, determining that the normalized value of the second pixel is the maximum normalized value for the second block;
   indicating that the normalized value of the second pixel is a threshold value for the second block; and
   comparing a value of the first pixel to the threshold value.

18. The system of claim 17, wherein determining that the normalized value of the second pixel is the maximum normalized value for the second block further comprises:
   determining a third block of pixels from the third digital image, the third block of pixels including the third pixel;
   normalizing a value of the third pixel, wherein the value is normalized with respect to all other pixels in the third block, and
   comparing the normalized value of the third pixel to normalized values of all other pixels in the third block;
   based on the comparison of the normalized values in the third block, determining that the normalized value of the third pixel is the maximum normalized value for the third block;
   determining that the second pixel having the maximum normalized value for the second block corresponds to the third pixel having the maximum normalized value for the third block.

19. The system of claim 15, wherein adjusting the color value of the first pixel based on the second pixel further comprises:
   comparing the second pixel to adjacent pixels in second image;
   determining that an additional color value of the second pixel is related to subject matter of the second image; and
   adjusting the color value of the first pixel based on the additional color value of the second pixel.

20. The system of claim 15, the processor further configured for aligning the first digital image with the second digital image, such that photographic content indicated by the first pixel is similar to photographic content indicated by the second pixel.

* * * * *